April 19, 1932.  G. B. WATKINS  1,854,496

SEAL FOR LAMINATED GLASS

Filed Dec. 8, 1928

Inventor
George B. Watkins
By Frank Fraser
Attorney

Patented Apr. 19, 1932

1,854,496

UNITED STATES PATENT OFFICE

GEORGE B. WATKINS, OF TOLEDO, OHIO, ASSIGNOR TO LIBBEY-OWENS-FORD GLASS COMPANY, OF TOLEDO, OHIO, A CORPORATION OF OHIO

SEAL FOR LAMINATED GLASS

Application filed December 8, 1928. Serial No. 324,591.

The present invention relates to an improved seal for laminated glass.

An important object of the invention is to provide as a new article of manufacture, a sheet of laminated glass comprising two or more sheets of glass and one or more sheets of non-brittle material, all of which sheets are bonded together to form a composite structure, the laminations being so arranged or worked that a channel or groove is formed around the edges of the laminated sheet, in which is inserted a sealing composition adapted to protect the bond between the laminations from atmospheric conditions, etc. in a manner to prevent separation of the laminations by such conditions.

Another object of the invention is to provide an improved sealing composition of such nature that it may be heated and reheated without injuring the same, the said composition also being of such nature that it will not flow below approximately 160 degrees Fahrenheit, and which remains plastic at approximately zero Fahrenheit.

Other objects and advantages of the invention will become more apparent during the course of the following description when taken in connection with the accompanying drawings.

Figure 1:
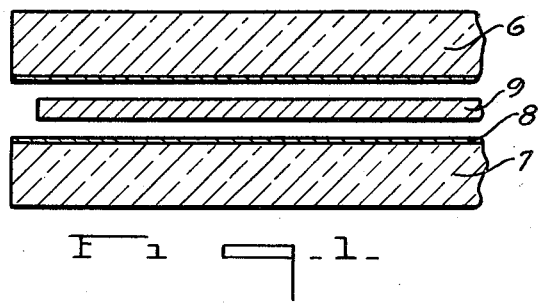
Figure 2:
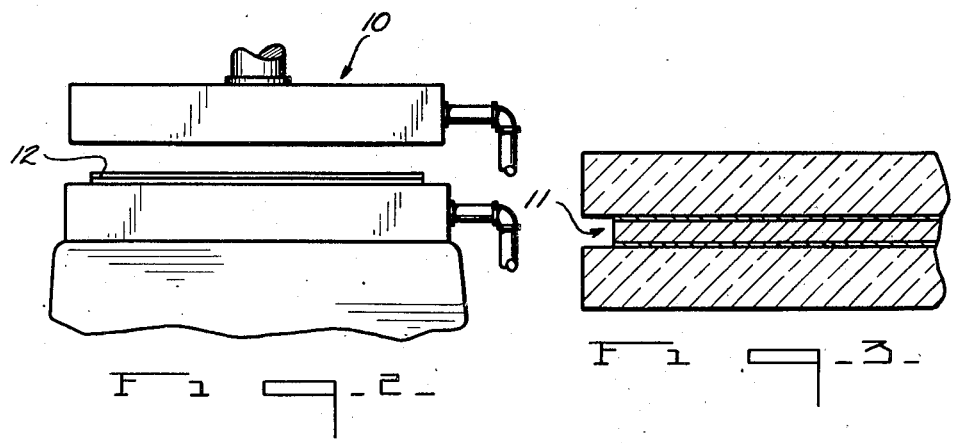
Figure 3:
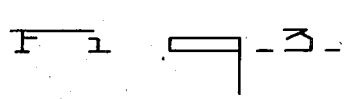
Figure 5:
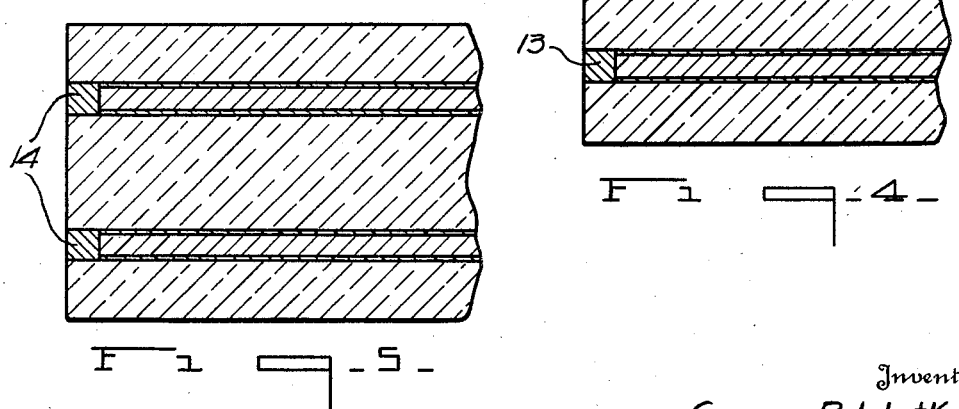
Figure 4:
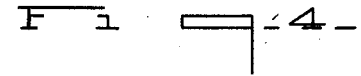

In the drawings wherein like numerals are employed to designate like parts throughout the same, Fig. 1 is a sectional view illustrating diagrammatically the laminations before they have been united to form a composite sheet, Fig. 2 is a diagrammatic representation of a form of means which may be used to press the laminations together, Fig. 3 is a fragmentary sectional view of a sheet of laminated glass before my improved seal has been applied, Fig. 4 is a similar view illustrating the sheet after the sealing material has been applied, and Fig. 5 is a similar section illustrating the so-called "bullet-proof" type of laminated glass.

Referring to Fig. 1, the numerals 6 and 7 designate two sheets of preferably transparent glass whose surfaces may be ground and polished, or not, as desired. Although the present invention is not limited to any particular process of producing laminated glass or ingredients used in the manufacture thereof, except of course the seal, I have illustrated a process wherein skins 8 are formed on the sheets of glass 6 and 7. These skins may be in the nature of a cellulose composition material or the like, and if such material is used, it is usually customary to apply some liquid to the surface of the skin to obtain a bond between the skin and the non-brittle sheet or lamination 9. On the other hand, instead of using the skin coats 8, a suitable cement or the like may be interposed between the three laminations 6, 7 and 9.

As shown in Fig. 1, the edge of the inner lamination or membrane 9 is not flush with the edges of the glass sheets so that after the laminations have been joined together by means of a press, designated in its entirety by the numeral 10 in Fig. 2, the sheet will have a channel 11 as shown in Fig. 3. On the other hand, the non-brittle sheet may be initially the same size as the glass sheets or larger, and then subsequently grooved out after the bonding operation. Ordinarily when using a press such as indicated by the numeral 10, it is customary to use the combined action of heat and pressure. When the laminations are in the assembled position indicated in Fig. 1, the term "sandwich" is used, the sandwich designated by the numeral 12 being interposed between the platens of the press, and during the pressing operation it is preferred that the pressure be applied initially centrally of the sandwich and then gradually spread over the entire area thereof in a manner to expell excess liquid, air, etc.

To protect the bond between the laminations and the material used between the glass sheets, I propose to use an improved seal. This seal is formed from a composition that will not be noticeably affected by the atmosphere or the like, and which will adequately protect the laminated sheet. Due to the characteristics of the sealing medium, it is preferred that it be applied while in a heated condition, and to prevent waste the composition is of a nature that it may be heated and reheated numerous times without causing a deterioration of such composition. As an example of a seal which may be used, I set forth the following:

5 lbs. Chinawood oil, 4 lbs. rosin, 4 lbs. gilsonite, 10 oz. carnauba wax, 1 oz. lead resinate, 1 oz. cobalt resinate.

Although I have set forth specific amounts of ingredients to be included in the mixture, it will of course be understood that the proportions can be varied one way or another. For instance, from one to six ounces of cobalt resinate can be used, etc. To prepare the mixture, the Chinawood oil and rosin are mixed together and preferably cooked to produce a heavy body and to produce a thoroughly homogeneous mass of rosin and oil. This forms a base or body, the Chinawood oil, in effect, constituting the body while the rosin adds adhesive qualities to the mixture. The other ingredients may then be added to the mixture of Chinawood oil and rosin. The carnauba wax and the rosin tend to harden or stiffen the body. The gilsonite acts as a coloring matter, being relatively very hard pitch which is mined. The lead resinate and cobalt resinate serve as driers, and their quantities may be varied as desired to give the proper drying of the mixture. It is preferred that the carnauba wax be incorporated in the mixture at a temperature slightly above the melting point of said wax, the reason being that if the temperature is too high the wax forms a true solution, and the resultant mixture including the wax will have a tendency to flow at relatively low temperatures. By incorporating the wax just above its melting point, this difficulty is eliminated. The resultant mixture may be introduced within the channel 11 in Fig. 3 to create the seal 13 of the sheet shown in Fig. 4. The sealing compound may be contained in a suitable heated receptacle and fed or otherwise introduced into the channel by means of any suitable implement. As the mixture or composition may remain in the heated receptacle for a long period of time, it is important that such mixture does not become lumpy, and it has been found that the above mixture gives a sealing material that can be heated over and over without becoming lumpy or otherwise adversely affected. Due to the presence of the gilsonite, the seal will be dark and probably black if the amount above set forth is used. Although carnauba wax is specifically mentioned heretofore, any substituted wax may be used provided such substituted wax will properly incorporate with the oil and rosin base.

In Fig. 5 is illustrated a sheet of "bullet-proof" type of glass, and it is provided with two seals 14 produced from my improved mixture.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. An improved seal for laminated glass formed from a mixture of oil, rosin, and gilsonite mixed with wax.

2. As a new article of manufacture, a sheet of laminated glass including a seal formed from a mixture of oil, rosin, carnauba wax, and gilsonite.

3. An improved seal for laminated glass formed from an oil and rosin thoroughly mixed together and to which has been added carnauba wax and gilsonite.

4. An improved seal for laminated glass formed from an oil, rosin, wax, a drier, and gilsonite.

5. An improved seal for laminated glass formed from a mixture of Chinawood oil, rosin, gilsonite, carnauba wax, and a drier.

6. An improved seal for laminated glass formed from a mixture of Chinawood oil, rosin, gilsonite, carnauba wax, lead resinate, and cobalt resinate.

7. An improved seal for laminated glass formed from a mixture consisting of and having approximately the following relative proportions: 5 lbs. Chinawood oil, 4 lbs rosin, 4 lbs. gilsonite, 10 oz. carnauba wax, 1 oz. lead resinate, and 1 oz. cobalt resinate.

Signed at Toledo, in the county of Lucas and State of Ohio, this 4th day of December, 1928.

GEORGE B. WATKINS.